(No Model.) 6 Sheets—Sheet 1.
W. D. KENZIE.
MACHINE FOR MAKING GLUE JOINTS.
No. 556,679. Patented Mar. 17, 1896.
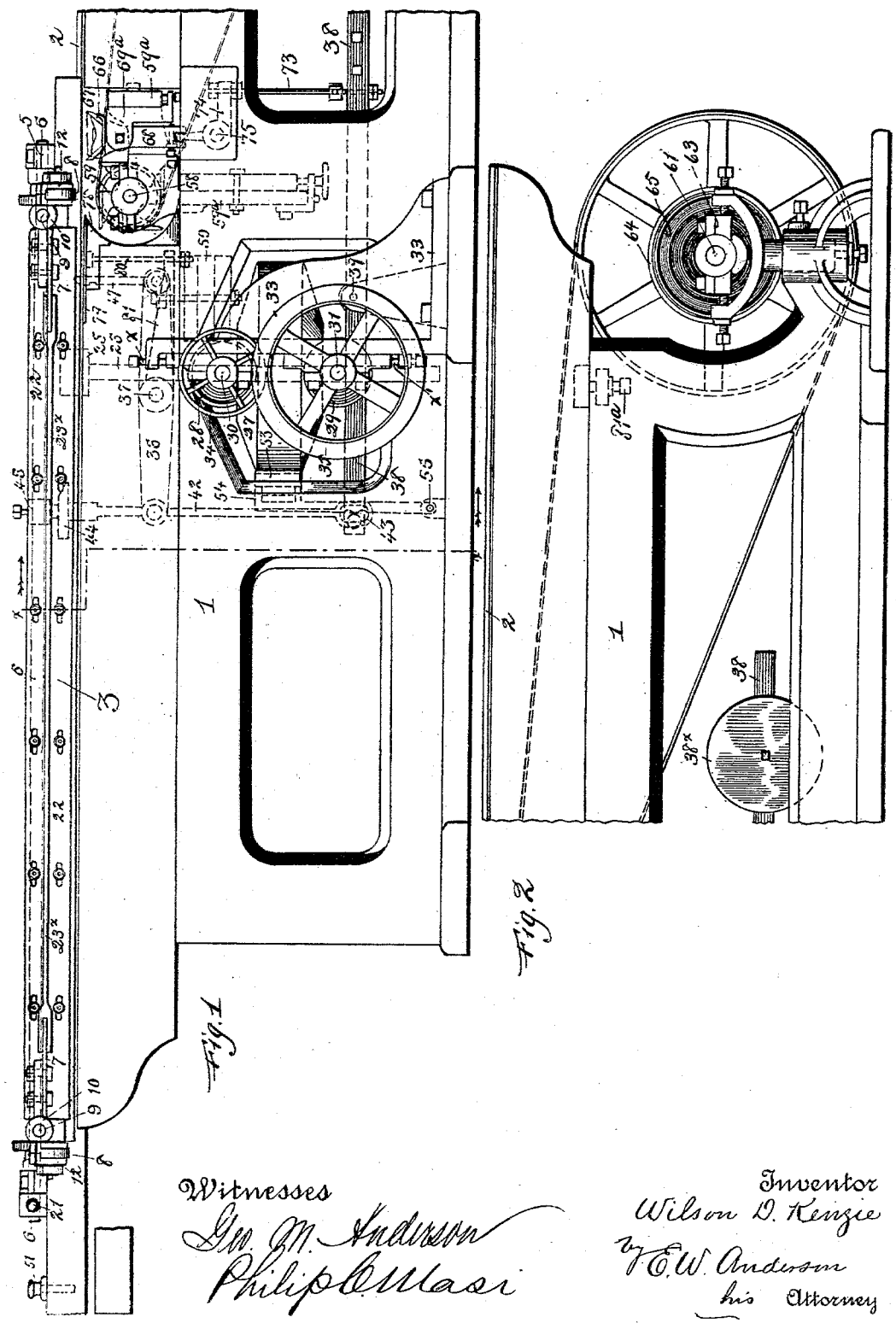
Witnesses
Geo. M. Anderson
Philip C. Masi
Inventor
Wilson D. Kenzie
by E. W. Anderson
his Attorney

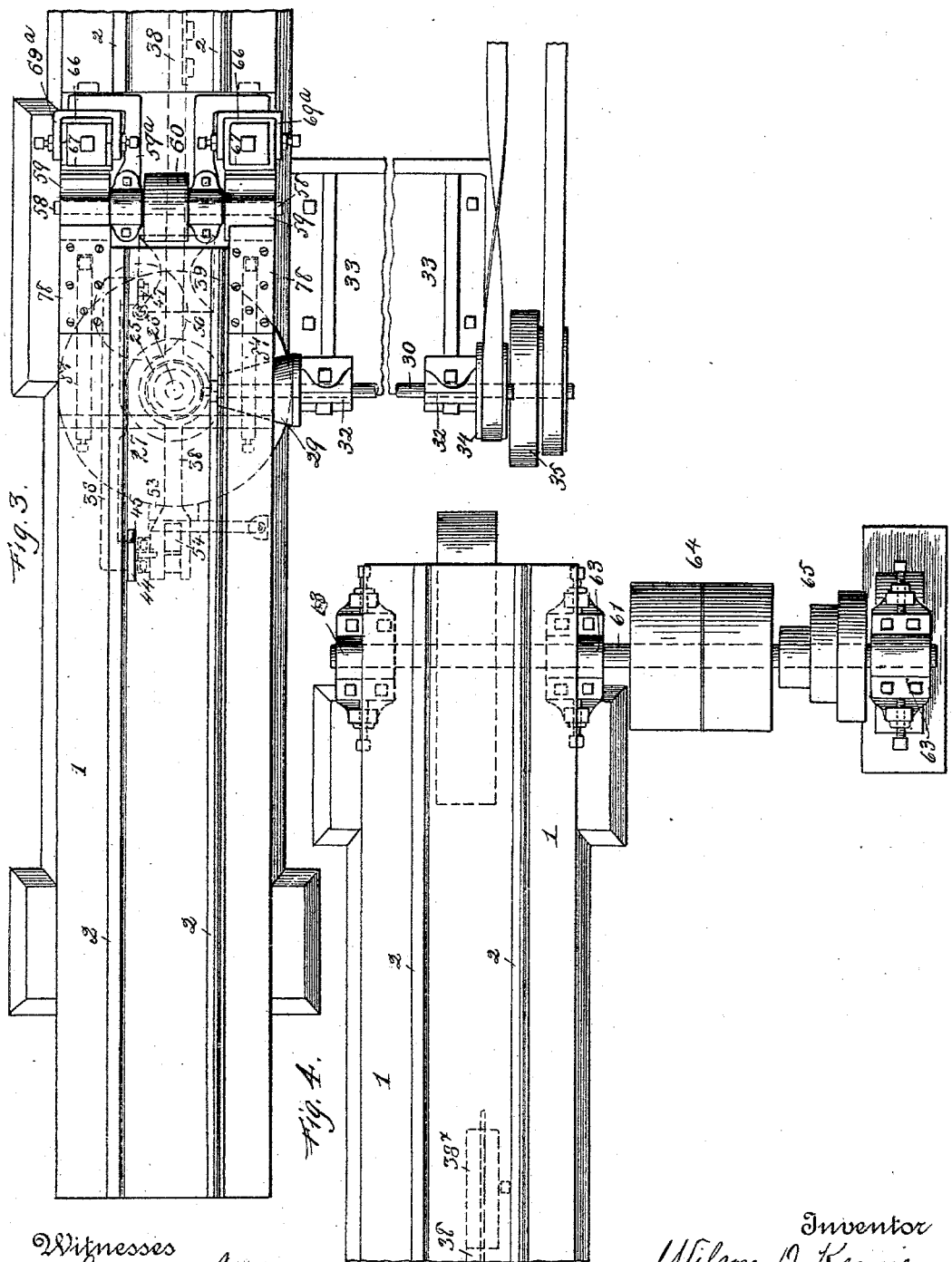

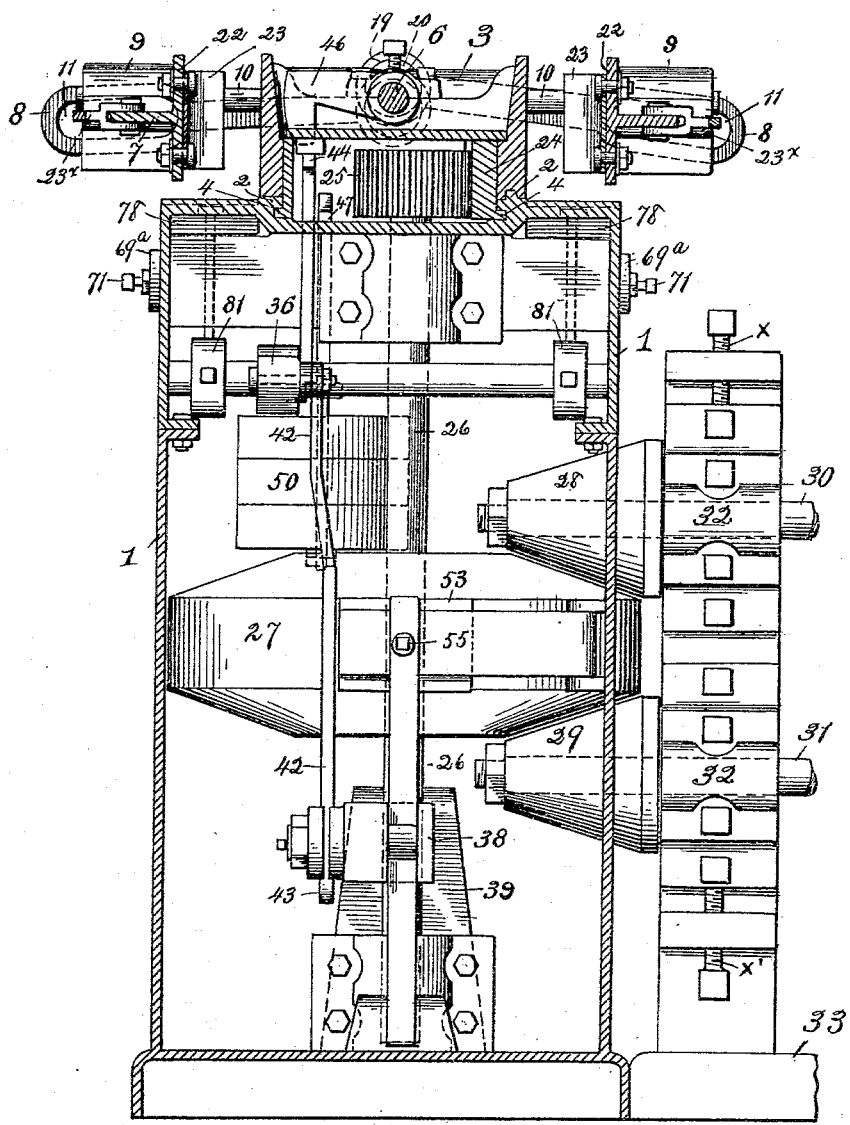

(No Model.) 6 Sheets—Sheet 4.
W. D. KENZIE.
MACHINE FOR MAKING GLUE JOINTS.
No. 556,679. Patented Mar. 17, 1896.
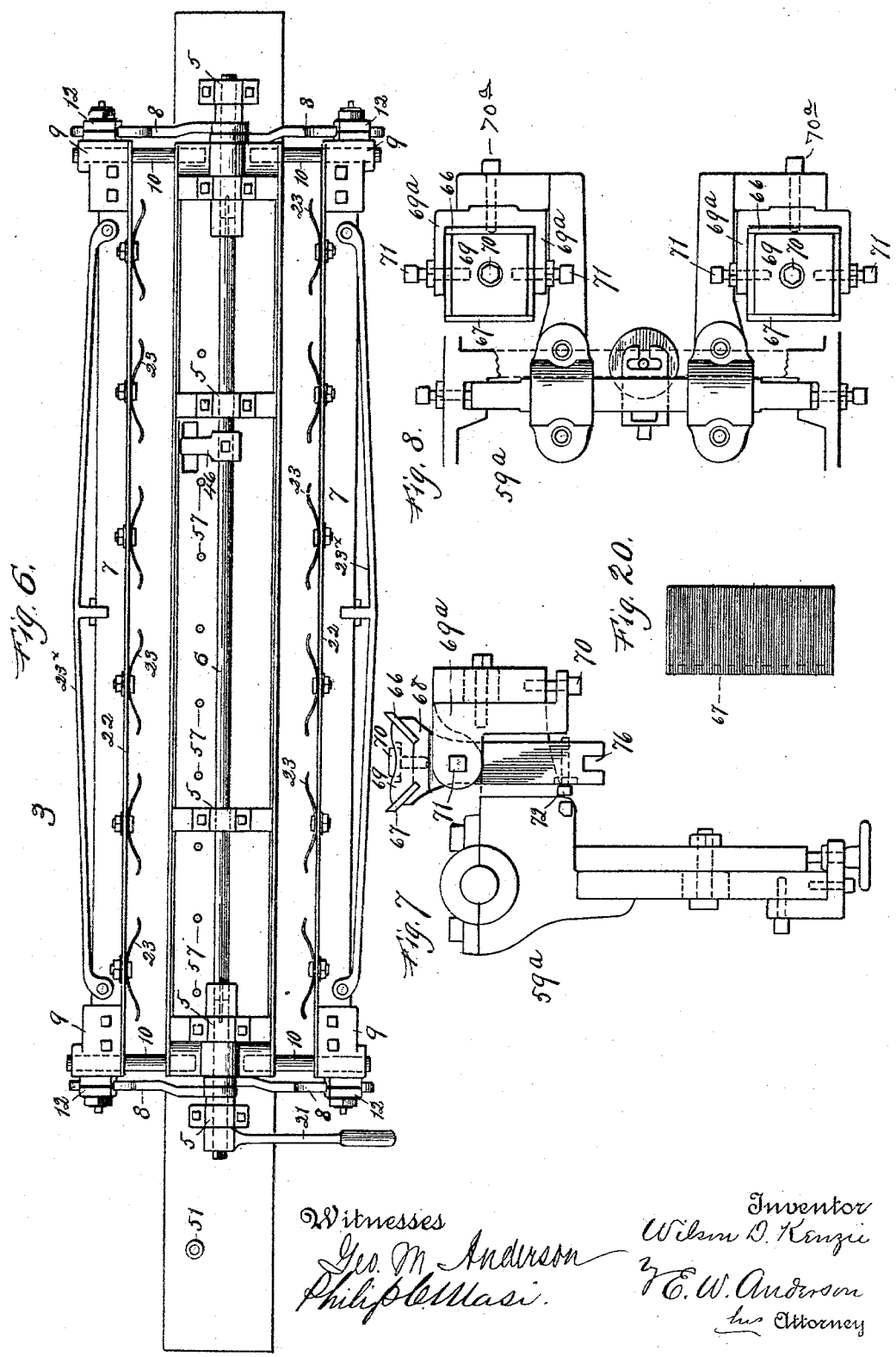

(No Model.) 6 Sheets—Sheet 5.
W. D. KENZIE.
MACHINE FOR MAKING GLUE JOINTS.
No. 556,679. Patented Mar. 17, 1896.
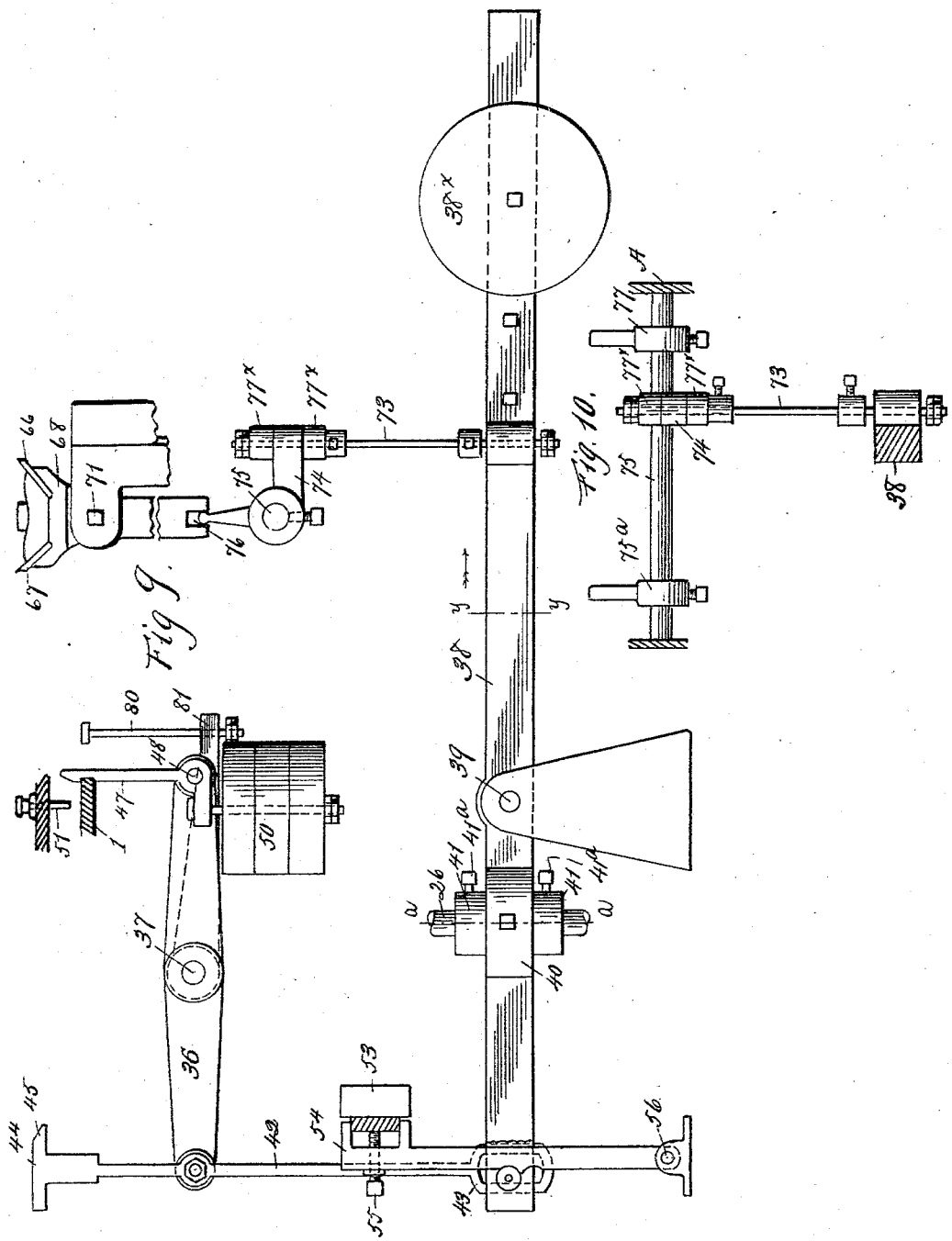
Witnesses
Geo. M. Anderson
Philip Lemasi
Inventor
Wilson D. Kenzie
by E. W. Anderson
his Attorney
ANDREW B.GRAHAM, PHOTO-LITHO. WASHINGTON, D.C.

(No Model.) 6 Sheets—Sheet 6.
W. D. KENZIE.
MACHINE FOR MAKING GLUE JOINTS.
No. 556,679. Patented Mar. 17, 1896.
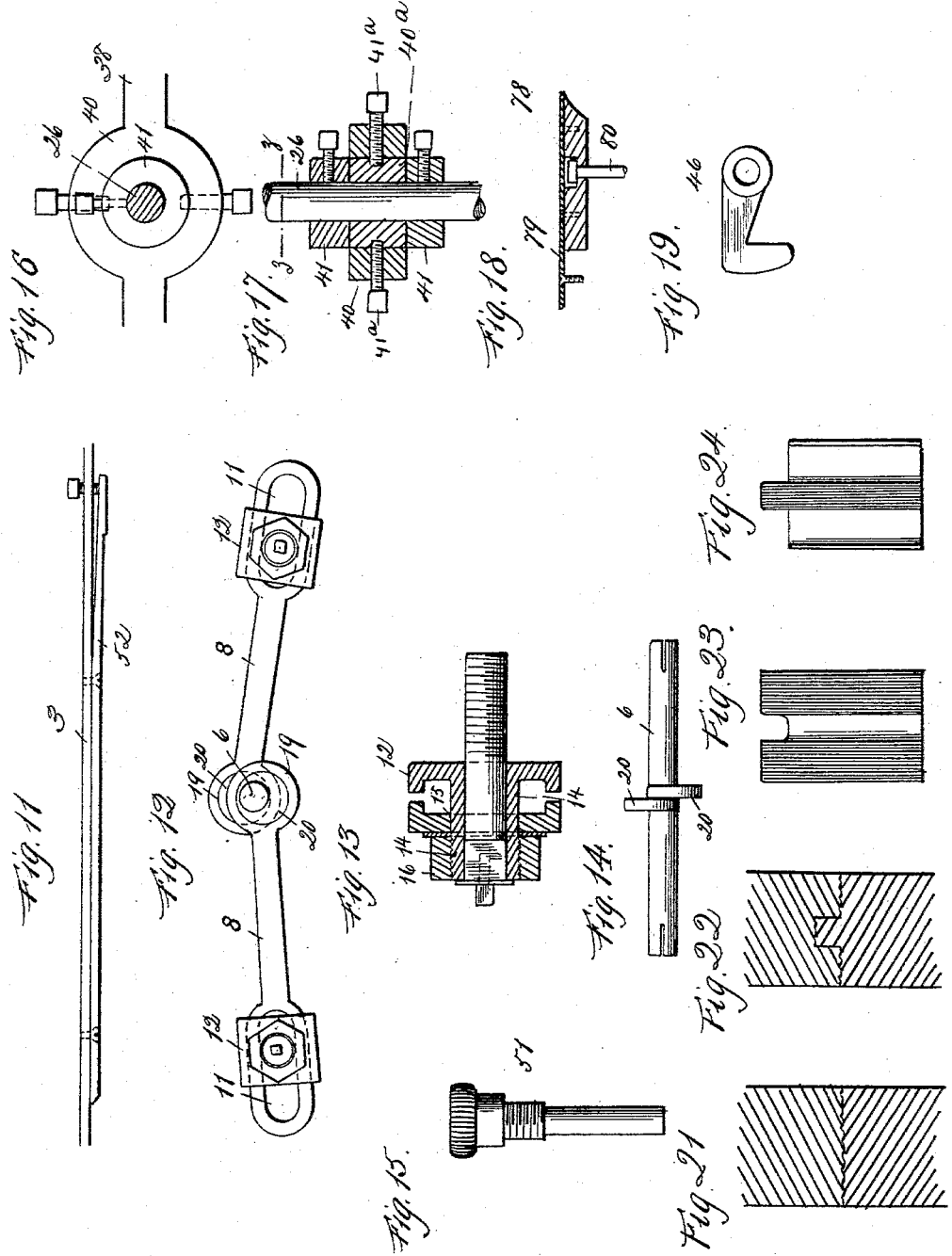
Witnesses
Geo. M. Anderson
Philip C. Masi.
Inventor
Wilson D. Kenzie
by E. W. Anderson
his Attorney

UNITED STATES PATENT OFFICE.

WILSON DANIEL KENZIE, OF BELOIT, WISCONSIN.

MACHINE FOR MAKING GLUE JOINTS.

SPECIFICATION forming part of Letters Patent No. 556,679, dated March 17, 1896.

Application filed January 24, 1895. Serial No. 536,100. (No model.)

*To all whom it may concern:*

Be it known that I, WILSON DANIEL KENZIE, a citizen of the United States, and a resident of Beloit, in the county of Rock and State of Wisconsin, have invented certain new and useful Improvements in Machines for Making Glue Joints; and I do declare the following to be a full, clear, and exact description of the invention, such as will enable others skilled in the art to which it appertains to make and use the same, reference being had to the accompanying drawings, and to figures of reference marked thereon, which form a part of this specification.
Figure 1 is a side elevation of machine, broken and the inner mechanism indicated in dotted lines. Fig. 2 is a side elevation of that part of machine broken from Fig. 1. Fig. 3 is a plan of machine broken, the carriage being removed, and the inner mechanism indicated in dotted lines. Fig. 4 is a plan of that part of machine broken from Fig. 3. Fig. 5 is a section on line $xx$, Fig. 1. Fig. 6 is a plan of carriage. Fig. 7 is a side elevation of yoke, showing rocking cutter and means of adjustment, the spindle, rotary cutters and pulley being removed. Fig. 8 is a plan view of same, showing means of adjustment of yoke. Fig. 9 is a side elevation of lever mechanism detached. Fig. 10 is a section on line $yy$, Fig. 9, with weight $38^x$ removed. Fig. 11 is a detail of incline on bottom of carriage. Fig. 12 is an end elevation of the links, their actuating-eccentrics, and the nut-boxes. Fig. 13 is a vertical section through one of the nut-boxes. Fig. 14 is a detail of eccentrics 8 and section of shaft. Fig. 15 is a detail of stop for carriage. Fig. 16 is a section on line $zz$, Fig. 17. Fig. 17 is a section on line $aa$, Fig.
9. Fig. 18 is a longitudinal section of chip-breaker. Fig. 19 is a detail of the arm 46. Fig. 20 is a top view of one of rotary cutters, showing grooves. Figs. 21 and 22 are detail sectional views illustrating two different forms of joints which may be made by the machine. Figs. 23 and 24 are detail views of cutters which may be employed to form the joint shown in Fig. 22.

This invention has relation to certain new and useful improvements in glue-jointing machines or that class of machines which are employed in jointing surfaces which are to be united with glue; and it consists in the novel construction and combination of parts, all as hereinafter described and pointed out in the appended claims.

An object of the invention is to provide an improved machine of the above-named character designed to do all kinds of jointing, and which can be regulated to make a perfectly-straight or slightly-curved joint, as may be desired, by means of a simple adjustment.

A further object consists in the provision of an improved arrangement of rotary and stationary cutters, the latter being designed to finish the joint and to thereby permit a much faster feed than would otherwise be possible.

A further object consists in the provision of an improved reciprocating carriage and work-clamp, together with improved driving, starting, stopping and reversing mechanism for the carriage, the starting, stopping and reversing mechanism being automatic in its action.

A further object consists in the construction and combination of minor parts of the machine, all as will hereinafter fully appear.

Referring to the accompanying drawings, the numeral 1 designates the frame of the machine, which is of elongated form and of such character as to form a proper support for the operative parts now to be described. Upon the upper surface or table of this frame are formed longitudinal, parallel, planed tracks 2 2, which support and form guides for a reciprocating feed-carriage 3. Said carriage has an elongated bed formed on its under face with the guides 4 4, which embrace the tracks 2 2, and upon its upper face with bearings 5 for a central longitudinal rock-shaft 6.

7 7 are parallel lateral clamp-bars which secure the work and which are connected near each end by links 8 8, which are secured at their outer ends to slide-boxes 9 of the clamp-bars, which boxes work upon transverse rods 10. The outer ends of said links are slotted at 11, as best seen in Fig. 12, and are secured to the slide-boxes 9 by means of the nut-boxes 12. (Shown in detail in Fig. 12.) Said nut-boxes are secured to the respective slide-boxes, and are formed each in two sections, one of which has a boss 14, which engages an opening 15 in the opposing section and is held by a nut 16. Said boss 14 forms the bearing for the slotted end of the link 8. This connection of the link provides means for its adjustment as to length under different adjustments of the clamp-bars. The inner ends of the link 8 have each a circular opening 19, which engages an eccentric 20 on the shaft 6. The two links of each pair engage opposite eccentrics, as best seen in Figs. 12 and 14, so that when said shaft is rocked by a lever 21 both links of each pair will be drawn together and the clamp-bars caused to approach each other. Said clamp-bars are usually of T form in cross-section, the broad flange 22 thereof forming the clamping-face, a series of curved springs 23 being bolted thereto to make yielding contact with the work.

$23^x$ indicates strut bars or braces, one at each side of the carriage, connected to the clamp-bars.

The steel end portions of the shaft 6 which carry the eccentrics 20 are usually made separate from the main length of the shaft. (See Fig. 14.)

On the under side of said carriage is a longitudinal rack-bar 24 whose teeth mesh with a pinion 25 on the upper portion of a vertical shaft 26, supported in central bearings of the frame and capable of a limited vertical movement, the pinion being sufficiently long to always maintain its engagement with said rack. Carried by said shaft 26 is a large cone-surfaced friction-wheel 27, which is arranged to be driven by contact with either one of two friction-cones 28 29, one of which is arranged to make contact with the upper surface of said wheel and the other with the lower surface thereof. Said cones are carried respectively by shafts 30 and 31, which are journaled in bearings 32 in a lateral extension 33 of the frame. The upper shaft, 30, carries a driving-pulley 34, and the lower shaft, 31, a cone-pulley 35, which are straight-belted to a power-shaft, (not shown,) the pulley 34 being belted to the same shaft. The bearings 32 for the shafts 30 and 31 are made capable of vertical adjustment, as indicated at X X'.

When the machine is at rest neither of the friction-cones 28 29 are in driving contact with the friction-wheel 27, and the means whereby said cones are automatically brought into alternate contact therewith will now be described.

36 designates an upper lever which extends under the table slightly to one side of the shaft 26, being pivoted intermediate to its ends at 37 to permit it to vibrate in a vertical plane. 38 is a second lever below the first and pivoted at 39 to an arm of the frame. The pivotal point of each lever is substantially central, the lever 38 being longer than the lever 36, the extension being toward the back of the machine and having a weight $38^x$ slidable thereon, said weight being sufficiently heavy to raise the shaft 26 to bring the friction-wheel 27 into engagement with the upper cone, 28. Said lever 38 has a collar 40 which extends around the shaft 26 and is made fast thereto by set-collars 41. Within said collar 40 is a bushing $40^a$. $41^a$ is a set-screw through the collar 40 into the said bushing. Connecting the front portions of said levers 36 and 38 is a rod or lever 42. The slotted lower end, 43, of said lever is connected to the lever 38 by a box-and-nut device similar to that described in connection with the links 8 and shown in detail in Fig. 13. The connection with the lever 36 is a pivotal one, the rod or lever 42 being extended above said lever 36 and carrying at its upper end a block 44, having an inclined face 45.

On the central shaft 6 of the carriage is an arm 46, so situated that when the clamping-lever 21 is actuated to clamp the work said arm will contact with the block 44 and thereby depress the rod or lever 43.

47 designates an angular arm which is hung on a stud 48, projecting from the rear arm of the lever 36. The vertical portion of said arm has a hook 49 arranged to engage the frame and thereby hold the parts in driving relation with the friction-cones. Attached to the shorter portion of said arm is a weight 50 designed to hold said hook in place.

As the lever 21 is thrown over to clamp the work, its arm 46 contacts with the block 44 and depresses the rod or lever 43. This action raises the rear arm of the lever 36 and engages the hook 49. It also depresses the front arm of the lever 38, and through the attachment of said lever to the driving-shaft 26 draws said shaft downward and brings the wheel 27 into driving-contact with the lower cone, 29. The carriage now moves over the cutters presently to be described, and continues its movement until a stop 51 on the bed of the carriage strikes against the projecting end of the hook 49 and depresses the arm 47, allowing the weight 50 to drop. This action, through the levers 36 and 38 and their connection 43, raises the friction-wheel 27 out of engagement with the lower cone, 29, and into engagement with the upper cone, 28, and as said cone 28 is rotated by its cross-belt in the opposite direction to the cone 29 the carriage is reversed and runs back. The block 44 having been raised by this action it is engaged by an incline 52 on the under face of the carriage as the latter has about completed its return movement, which again depresses said block sufficient to leave the friction-wheel 27 out of engagement with the cone 28 and by means of a brake 53, now to be described, to stop the carriage with the arm 46 over the block 44. Said brake comprises a shoe 53, which is arranged to impinge against the periphery of the friction-wheel, being adjustably held in a lever-arm 54 and regulated by a screw 55. The lever-arm 54 is hinged to the lower portion of the machine at 56, and extends upward in proximity to the rear extremity of the lever 38, upon which is a roller $39^a$, arranged, when said lever is depressed sufficiently to engage said lever-arm 54, to rock said arm on the pivot 56 and force the brake into engagement with the wheel 27. This occurs when said lever 43 is depressed by the incline 52. As the carriage stands at rest (with clamps open) it will be observed that the incline 52 is holding down 44 with roller 39$^a$ engaged with 54 forcing brake against friction-wheel.

Now in operating the machine the arm 46 is brought over and down on 44, which depresses 36 and 38 about one-fourth inch, or sufficient to raise the rear arm of 36 and engage hook 49 over top of frame, (this also engages feed-friction,) and as the carriage feeds in stop 51 strikes 49, which will drop. At the same time 44 will rise about one-fourth inch higher than it was when the carriage was at rest. Block 44 having been raised by this action will remain there while the carriage is returning until incline 52 slips over 44, depressing it (44) sufficient to disengage frictions, and as the incline increases at the end 44 will be depressed still further or just where it was before the operation was commenced with 39$^a$ and 54 engaged. 44 will raise 46, partially unclamping the stock. As the eccentrics are just past the centers when clamp is closed, there is not much force required to throw them out. The momentum of the carriage makes it uncertain just where it will stop. Hence the brake.

The stop 51 is arranged to be inserted in any one of a series of holes 57 in the bed of the carriage and thereby regulate the length of the joint.

58 designates a transverse spindle which carries at each end portion a rotary cutter-head 59. Said spindle is journaled in a yoke 59$^a$ of the frame at about the central portion thereof, and carries at its middle portion a pulley 60, which is belted to a driving-shaft 61 at the rear portion of the frame, supported in adjustable bearings 63 and having a fast and loose pulley 64 and a cone-pulley 65. Directly in rear of each rotary cutter-head are two stationary cutters 66 67, which are set oppositely to each other and obliquely, and are held in a rocking carrier 68 by means of a cap 69 and a screw 70. Each of the carriers 68 is pivotally supported in a frame 69$^a$, which is adjustably held in the yoke 59$^a$ by means of a screw 70$^a$. Screws 71 give said carriers a lateral adjustment, while a screw 72 limits its rocking or tilting movement and permits one knife to be given a greater or less cut than the other. In order to automatically rock said cutter-carrier to present the cutters alternately to the work as the carriage is reversed, the lever 38 is provided on its rear arm with a vertical rod 73, upon the upper portion of which is secured a rocker-arm 74, which is fast to a rock-shaft 75 extended across the machine. On said shaft 75 is an arm 75$^a$ which engages a groove or slot 76 in one of the cutter-carriers 68. At the opposite side of the cutter-machine the shaft 75 is provided with an arm 77, which engages in a similar manner the other of said cutter-carriers. By this arrangement it will be readily seen that upon each reversal of the carriage the cutter-carriers will be rocked to present the proper cutter to the work. These cutters finish the work, which, upon the back travel of the carriage, pass clear of the rotary cutters.

The cutters on the rotary heads will correspond in form to the stationary cutters. Different forms of cutters will be used for different joints. For instance, in Fig. 20 I have shown a straight-edged cutter or knife adapted to form a straight-faced joint, such as shown in Fig. 21. This cutter has preferably a serrated or corrugated face and edge in order to make a somewhat roughened surface to cause the glue to adhere better. In Fig. 22 is shown a tongue-and-groove joint, and in Figs. 23 and 24 are shown cutters which may be employed to form such joint.

As above stated, the rotary and relatively-fixed cutters are of the same form, with the exception that the rotary cutters are smooth, while the relatively-fixed cutters are milled or corrugated, as described. The object of the relatively-fixed cutters is to make a smooth joint, similar to a joint made by a hand toothing-plane, such as is employed by cabinet-makers. These cutters smooth off the marks made by the rotary cutters and admit of the stock being fed much faster than would be possible if the rotary cutters only were employed. The corrugations in the cutters are fine. I usually employ as many as sixty-four to the inch.

77$^x$ designates the rubber washers and the set-collars which secure the rocker 74 on the rod 73.

78 78 designate chip-breakers, one for each rotary cutter-head. Each of said breakers is secured to the frame by a spring 79, and is held in proper relation to the cutter-head by means of a rod 80, which is connected at its lower end to an arm 81, which extends from the rod or shaft 37, upon which the lever 36 fulcrums. By means of a nut on the lower end of the rod 80 said breaker may be adjusted to give it the proper tension.

Referring to Fig. 1 of the drawings, it will be observed that the arm is raised above the nut on the lower end of the rod 80, which permits the spring 79 to act to throw the breaker 78 upwardly into contact with the piece of material being jointed. Owing to this spring it will be observed that the breaker will readily follow any curve which may be in the piece operated upon. When, however, the stop 51 strikes against the hook 49, as hereinbefore described, the rocking of the shaft 37, to which the arm 81 is secured, causes the said arm to be depressed against the nut or rod 80, and thereby draws the breaker 78 79 down to the level of the frame or bed. When the block 44 is again depressed by the operation of clamping the material in the carriage, rear arm of 81 is again raised and the breaker is released.

81ª designates an adjusting-screw at the rear portion of the bed of the table by means of which the machine may be adapted to form a slightly-curved joint.

Different forms of cutters may be employed for making different styles of joints.

Having thus described my invention, what I claim as new, and desire to secure by Letters Patent, is—

1. In a machine for the purpose described, the combination of a frame, a carriage arranged to reciprocate horizontally on tracks or guides of said frame, said carriage having means for clamping and holding the work, a longitudinal rack-bar on the underside of said carriage, a vertically-movable shaft having a pinion which is in engagement with the teeth of the said rack, a double-cone-surfaced friction-wheel on the said shaft, friction-driving cones, one above and one below the said friction-wheel, lever devices connected with the said shaft, an arm on the clamping-shaft of the said carriage arranged to actuate said lever devices to raise the said shaft, means operated automatically by contact with the carriage to actuate said levers to lower the said shaft at the proper time, and a brake device arranged to stop said carriage at the end of its return movement in the proper position for the commencement of the next operation, substantially as specified.

2. In a machine for the purpose described, the combination with a horizontally-reciprocating carriage, the vertical driving-shaft capable of a vertical movement, and gear for rotating said shaft in either direction, of the upper lever 36, the lower lever 38 having a connection with said shaft, the rear arm of said lever 38 being weighted, the rod or lever 42 which connects the forward arms of the said levers 36 and 38, an arm carried by the carriage and adapted to act upon said rod or lever 42, the weighted angular arm 47, carried by the lever 36 and adapted to engage the frame of the machine, means on the carriage for contact with the arm 47 to disengage it from the frame, said carriage having also an inclined portion 52 for engagement with the rod or lever 42, and a brake device arrangement to operate automatically to stop said carriage at the proper time and place, substantially as specified.

3. In a glue-jointing machine, the combination with the horizontally-reciprocating carriage, its driving-shaft, and means for rotating said shaft in either direction, of the upper lever 36, the lower lever 38 having a connection with said shaft, the rod or lever 42 connecting the forward arms of the said levers 36 and 38, and means for automatically operating said levers 36, 38 and 42 to throw said shaft into gear with its driving mechanism at the commencement of the operation, to reverse said shaft at the close of the forward movement of the carriage, and to throw said shaft out of gear at the close of the return movement of the carriage, together with brake mechanism arranged to automatically stop said carriage at a certain point upon the close of its return movement, substantially as specified.

4. In a machine for the purpose described, the combination with the levers 36, 38, and the rod 42 arranged to operate substantially as and for the purpose described, of the brake-arm 54 fulcrumed at its lower end, the brake-shoe 53 carried by said arm and arranged to contact with a wheel on the main driving-shaft of the machine, and a roller carried by said lever 38, said roller engaging the said brake-arm, all substantially as and for the purpose described.

5. In a feed-carriage for woodworking-machines, the combination of the parallel clamp-bars 7, 7, the longitudinal rock-shaft 6 having the opposite eccentrics 20, one pair near each end of said shaft, the two pairs of links 8, 8, said links having each at its inner end portion a circular opening which is fitted to one of said eccentrics, and at its outer end an elongated slot, the slide-boxes 9 of the said clamp-bars, and the two-part nut-boxes 12 secured one to each of said slide-boxes, one part of each of said boxes having a boss 14 which engages an opening 15 in the opposing part, the said boss forming a bearing for the slotted end of one of the links, substantially as specified.

6. In a glue-jointing machine, the combination of the vertically-movable shaft 26, its friction-wheel 27, the positively-driven friction-cones 28, 29, the lever 38, connected to said shaft to one side of its fulcrum, the lever 36, the weighted arm 47 carried thereby and arranged to engage the frame, the rod or lever 42, the block 44, thereon, a reciprocatory carriage, the shaft 6 thereof, its arm 46 arranged to engage said block 44, the adjustable stop 51 of said carriage arranged to engage said arm 47, and an incline 52 arranged to engage said block 44, substantially as specified.

7. In a glue-jointing machine, the shaft 26, its friction-wheel 27, the positively-driven friction-cones, the lever 38 engaging said shaft, the lever 36, its weighted hooked arm 47, the rod or lever 42, connecting the levers 36, 38, the block 44, carried by said rod or lever 42, the brake device 53, 54, arranged to act on the wheel 27 and actuated by the rod or lever 42 and the lever 38, all in combination with a carriage driven by the shaft 26, and having a shaft 6, arm 46 on said shaft arranged to engage said block 44, incline 52 also arranged to engage said block 44, and an adjustable stop arranged to engage the arm 47, substantially as specified.

8. In a machine for the purpose described, the combination with a rotary spindle and a cutter-head on each end of such spindle, of a carrier 68 mounted to oscillate in a vertical plane directly in rear of each of said cutter-heads, the oppositely and obliquely set cutters 66, 67 in each of said carriers, frames 69 in which said carriers are supported, yokes 59ª in which said carriers are adjustably secured, and means for automatically rocking each of said carriers, substantially as and for the purpose specified.

9. In a machine for the purpose described, the combination with a rotary cutter-head and its cutters, of the chip-breaker 78, one end of which is adjacent to the said cutters and is shaped to conform approximately to the radius of the path thereof, the flat plate-spring 79 to which said breaker is secured, and which is secured to the frame of the machine the rod 80 having a head countersunk in the said breaker, and an arm 81 to which the opposite end of said rod is adjustably connected, together with means for operating said arm at the proper time, substantially as specified.

10. In a woodworking-machine, the combination of a chip-breaker, a spring which secures the said breaker to the frame, an arm operated by the carriage of the machine, and a connection between said arm and the said breaker, substantially as specified.

11. In a machine for the purposes described, the combination of a carrier 68, its oppositely and obliquely set cutters, a frame 69ª in which said carrier is pivotally held, a yoke 59ª in which said frame is adjustably secured, the lever 38, its vertical rod 73, a rocker 74 secured to said arm, a shaft which carries said arm, and an arm on said shaft arranged to engage said carrier.

12. In a machine for the purposes described, the combination with the main frame, the work holding and clamping carriage arranged to reciprocate on said frame, and means for driving, starting and automatically reversing and stopping said carriage, of the rotary shaft or spindle carrying at each end portion a cutter-head over which the carriage reciprocates, a cutter-carrier 68 mounted directly in rear of each cutter-head and arranged to oscillate in a vertical plane, the lever 38 which forms part of the mechanism for starting, reversing and driving said carriage, the rock-shaft 75 actuated by a connection with said lever, and arms on said shaft which engage the said carriers, substantially as specified.

In testimony whereof I affix my signature in presence of two witnesses.

WILSON DANIEL KENZIE.

Witnesses:
LOU RAUBENHEIMER,
GEORGE H. CRAM.